United States Patent [19]

Manes

[11] Patent Number: 4,834,217

[45] Date of Patent: May 30, 1989

[54] TREE STAND WITH IMPROVED LOCKING MEANS

[75] Inventor: Jack J. Manes, Tahlequah, Okla.

[73] Assignee: Prentiss Shelley, Welling, Okla. ; a part interest

[21] Appl. No.: 237,325

[22] Filed: Aug. 29, 1988

[51] Int. Cl.[4] .............................. A45F 3/26; A47C 9/10
[52] U.S. Cl. ..................................... 182/187; 108/152
[58] Field of Search ............... 182/187, 188, 204, 119; 108/152

[56]  References Cited

U.S. PATENT DOCUMENTS

| | | | |
|---|---|---|---|
| 3,509,966 | 5/1970 | Sarno | 182/119 |
| 4,130,180 | 12/1978 | Ferguson | 182/187 |
| 4,230,203 | 10/1980 | Sweat | 182/187 |
| 4,331,216 | 5/1982 | Amacker | 182/187 |
| 4,337,844 | 7/1982 | Hice | 182/187 |
| 4,428,459 | 1/1984 | Peck | 182/187 |
| 4,458,782 | 7/1984 | Meyer | 182/187 |
| 4,597,473 | 7/1986 | Peck | 182/187 |

Primary Examiner—Reinaldo P. Machado
Attorney, Agent, or Firm—Wigman & Cohen

[57] ABSTRACT

A tree stand comprising adjustable tree gripping and feet supporting means is also provided with spring actuated locking means for facilitating the adjustment of the tree gripping and feet supporting sections without the need for wrenches or other tools.

16 Claims, 1 Drawing Sheet

TREE STAND WITH IMPROVED LOCKING MEANS

BACKGROUND OF THE INVENTION

The present invention relates to new and useful improvements to tree climbing apparatus and, more particularly to apparatus comprising two climbing platforms formed of telescoping frame members which are alternately raised by the user to obtain a desired elevation in a tree or similar structure.

Hunters, wildlife photographers, and others are often desirous of climbing a tree or pole and remaining comfortably perched at the desired elevation until an animal emerges. To meet this need, a number of tree and pole climbing structures exist in the prior art. Exemplary patents relating to tree climbing stands which include telescoping frames are U.S. Pat. No. 4,331,216 to Joseph A. Amacker and U.S. Pat. No. 4,337,844 to Robert C. Hice, Sr. Each of the disclosed devices, however, requires the manipulation of nuts and bolts to attach and remove the stand to the tree. Such adjustments often prove time consuming and difficult, especially in the dark, and require the user to carry wrenches or similar tools into the field.

Attempts to obviate the aforementioned problem have been described in the prior art. U.S. Pats. Nos. 4,597,473 and 4,428,459 to Peck disclose tree stands wherein spring biased pins are employed for positioning the stand to the tree. One disadvantage of these prior art devices is that the spring is housed in a closed cylinder and therefore cannot be easily cleaned of rocks or other debris which causes the spring to jam.

It would therefore be desirable to provide a tree climbing stand which can be easily operated and adjusted in the field and which is not susceptible to malfunction.

SUMMARY AND OBJECTS OF THE INVENTION

In view of the foregoing limitations and shortcomings of the prior art devices, as well as other disadvantages not specifically mentioned above, it should be apparent that there still exists a need in the art for a tree climbing stand which is effective, safe, portable, and convenient to operate in the field and which may be quickly and easily attached and removed from a tree.

It is, therefore, a primary object of this invention to fulfill that need by providing a tree climbing stand which does not require the use of nuts, bolts, or the like in its operation.

Another object of the present invention is to provide a tree stand which employs locking means which is effective to use and economical to manufacture.

Still another object of the present invention is to provide a tree stand of the aforementioned type which is made of tubular members having non-circular cross-section for readily securing the locking device of the present invention.

A further object of this invention is to provide an apparatus for climbing trees, poles or the like comprising an upper section and a lower section wherein the upper section includes gripping means to engage the tree, a flexible seat, and a support platform whereas the lower section is similarly formed except that it functions to support the user's feet during the climbing operation.

These and other objects and advantages of the present invention will become apparent by reference to the more detailed description which follows, as well as to the appended claims and the several views illustrated in the drawings.

DETAILED DESCRIPTION OF A PREFERRED EMBODIMENT

Figure 1:
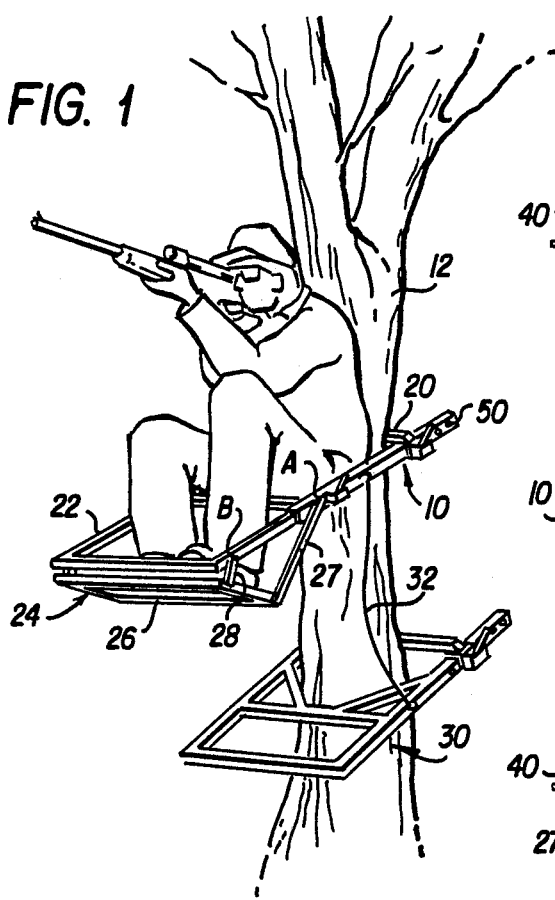
FIG. 1 is a pictorial view of the tree climbing stand of the present invention shown mounted on a tree and supporting a hunter.
Figure 2:
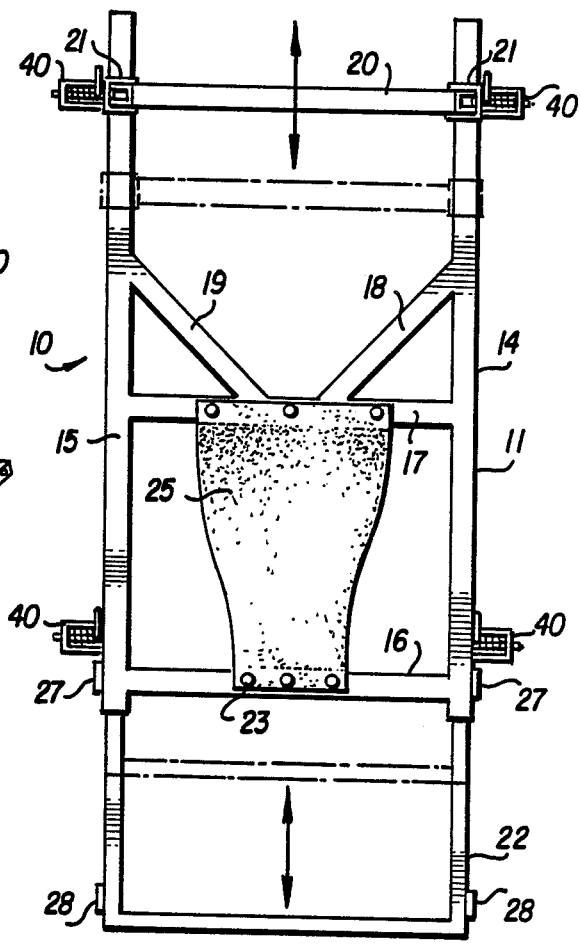
FIG. 2 is a top plan view of the first climbing element of the embodiment illustrated in FIG. 1.

Referring more specifically to the drawings wherein like numerals indicate like elements throughout the several views, there is illustrated in FIGS. 1 and 2 of the drawings a preferred embodiment of the tree climbing stand of the present invention designated generally by reference numeral 10.

Referring now in particular to FIG. 2, stand 10 is a generally rectangular main frame 11 formed of a pair of spaced side bars 14, 15, preferably steel or aluminum hollow square tubing. Side bars 14, 15 are spaced by fixed cross bars 16, 17, each having a length sufficient to permit tree trunks to fit between side bars 14, 15. A pair of tree gripping members 18, 19 are fixedly positioned to extend diagonally from the cross bar 17 to side bars 14 and 15, respectively. Gripping members 18, 19 may include piercing devices for penetrating the tree bark. Cross bar 20 is slidably mounted between side bars 14 and 15. Slidable cross member 20 is secured to a square collar 21 at each end which slides over side bars 14, 15 when the stand is positioned around the tree and is locked in place in a manner to be described in detail hereinafter.

A flexible seat 25 extends between cross bars 16 and 17 and is attached to the bars by snaps 23, velcro, or a similar removable fastener. As shown in FIG. 1, the hunter can comfortably be seated on seat 25 while waiting for his/her prey. A U-shaped frame 22 is telescopically secured to the front end of main frame 11 to pivotally secure a foot-receiving platform 24.

As shown in FIG. 1, platform 24 includes a frame 26 which supports a mesh screen, as shown in U.S. Pat. No. 4,331,216, on which the user's feet are placed. Platform 24 is pivotally secured to the main frame 11 at A using a pair of strut members 27, and to the telescoping U-shape frame 22 at B by a pair of strut members 28. By virtue of strut members 27, 28, platform 24 is pivotally connected in a manner which can accommodate differing leg sizes. For example, a tall person can sit comfortably by outwardly extending the U-shape frame 22 which in turn automatically extends the foot rest platform 24.

A lower frame 30 is tethered to the main frame 11 by a pair of oppositely positioned cables 32. Frame 30 is made identically to main frame 11 except that it does not include the U-shape telescoping frame 22 since it is only used during climbing or descending. The manner of use of upper and lower frames for climbing are well known in the art, see, e.g., U.S. Pat. No. 4,331,216 at columns 6 and 7 which is incorporated herein by reference.

LOCKING DEVICE

Figure 3:
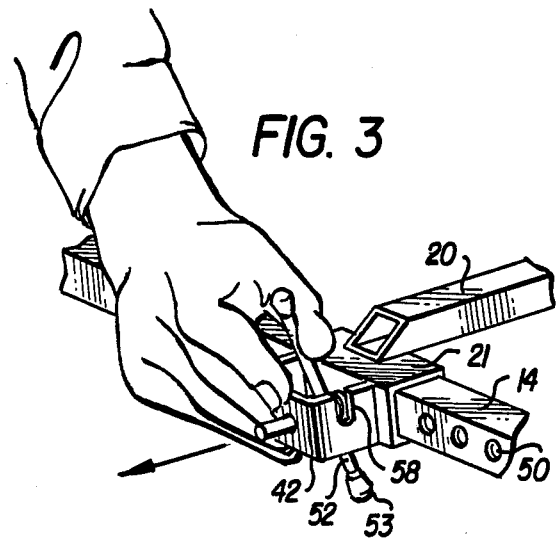
FIG. 3 is an enlarged perspective view of the locking mechanism of the present invention.
Figure 4:
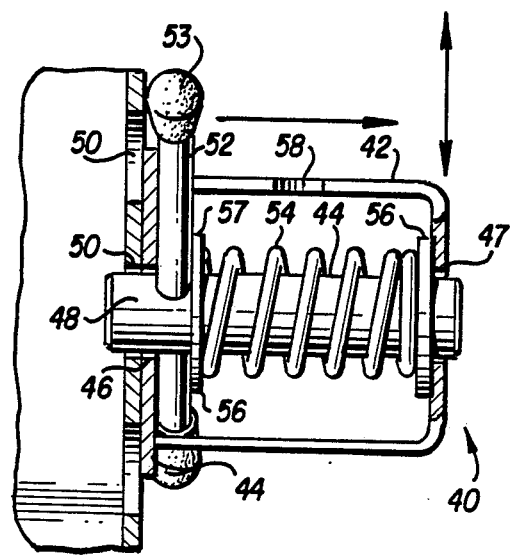
FIG. 4 is an enlarged top view partially in section of the locking mechanism of the present invention.

Referring now to FIGS. 3 and 4, there is shown the spring-biased locking mechanism 40, a key feature of the present invention. At the outset it should be mentioned that each of the locking mechanisms 40 is secured at those locations of the tree stand which are capable of being telescopically or slidably adjusted. Thus, the locking mechanism 40 permits quick and easy adjustments to be made without use of wrenches or the like.

The locking mechanism 40 of the present invention, a housing 42 and a steel bolt 44 is slidably mounted within housing 42 through openings 46, 47 at opposite ends thereof. One end 48 of the bolt 44 can project through one of the plurality of spaced holes 50 provided in side bars 14, 15 to position members 20, 22 in a desired position. A steel rod 52 with rubber caps 53 on both ends is secured to bolt 44 by either driving a slightly oversize rod through a hole in bolt 44, or, by threaded connection. Either way rod 52 extends beyond the upper and lower surfaces of housing 42 to facilitate its use as a handle. The bolt 46 is biased into engagement with the holes 50 by a spring 54 positioned between washers 56, 57 to move the projecting end 48 of bolt 46 into a selected opening 50.

In use, rod 52 is grasped and moved against the spring 54 (to the right in FIG. 4) to disengage the bolt end 48 from the hole 50. The pin is turned approximately 45°, then placed in a groove 58 defined in housing 42 thereby maintaining the locking device in its disengaged position. The groove 58 is not essential since the rod can be removed from one opening and quickly placed in another opening 50 without appreciable delay or inconvenience. Removal of the bolt 44 from the groove 58 allows the energy stored in spring 54 to return the bolt to its normal engaged position.

To clean or repair the locking mechanism 40, rod 52 is first removed thereby permitting bolt 44, spring 54 and 56, 57 to be easily removed, cleaned or replaced with ease.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. Apparatus for engaging a generally vertical member for supporting a person above the ground, comprising:
    a generally rectangular frame, including a pair of tubular side members;
    means provided at one end of said frame for gripping said vertical member;
    means provided at the opposite end of said frame for receiving the person's feet;
    means intermediate said ends of said frame for seating;
    said feet receiving means comprising:
    a pair of side members which slidably cooperate with said frame side members and include openings therein to permit adjustment of said feet receiving means;
    a pair of releasable locking means positioned on said frame and cooperating with said openings on said feet receiving means side members; each of said releasable locking means comprising a spring biased bolt which maintains said feet receiving means in secured relationship with said frame; and a handle secured to said bolt for moving said bolt against the action of said spring when the position of said feet receiving means requires adjustment.

2. The apparatus according to claim 1, wherein said locking means includes a pair of washers on opposite sides of said spring and a housing having openings for receiving opposite ends of said bolt.

3. The apparatus according to claim 1, further including at least two locking means associated with said vertical member gripping means whereby adjustments to differing sizes of said vertical member can be readily effected without wrenches.

4. The apparatus according to claim 1, wherein said feet receiving means includes a platform having a plurality of depending struts, two of which are pivotally secured to said frame in the vicinity of said seat, two of said struts being pivotally secured to said side members of said feet receiving means, whereby said platform is carried by side members and adjustment of said side members automatically adjusts the position of said platform for comfortably receiving the user's feet.

5. The apparatus according to claim 1, wherein said locking means handle is formed of a pin member which is perpendicularly attached to said bolt near its inner end.

6. The apparatus according to claim 5, wherein said locking means includes a housing having an opening in the upper portion thereof for receiving said pin when the bolt is retracted against the spring.

7. The apparatus according to claim 5, wherein said pin is removably secured to said bolt.

8. The apparatus according to claim 4, wherein said locking means handle is formed of a pin member which is perpendicularly attached to said bolt near its inner end.

9. The apparatus according to claim 4, wherein said locking means includes a housing having an opening in the upper portion thereof for receiving said pin when the bolt is retracted against the spring.

10. The apparatus according to claim 4, wherein said pin is removably secured to said bolt.

11. A tree stand comprising:
    a generally rectangular tubular frame having a square cross-section;
    a tree gripping section including a slidable cross member; said slidable cross member being carried by a generally hollow square collar at each end which cooperates with the side members of said tubular frame; each of said collar also carrying releasable locking means for removably positioning said gripping means cross member;
    each of said releasable locking means comprising a spring biased bolt which engages said frame side member; and a handle secured to said bolt for moving said bolt against the action of said spring.

12. The apparatus according to claim 11, wherein said locking means includes a pair of washers on opposite sides of said spring and a housing having openings for receiving opposite ends of said bolt.

13. A tree stand according to claim 11, further including adjustable platform means at the end of the frame opposite said gripping means; a pair of locking means provided on said frame for operatively coacting with platform adjusting means to permit varying the positions of said platform means.

14. The apparatus according to claim 11, wherein said locking means handle is formed of a pin member which is perpendicularly attached to said bolt near its inner end.

15. The apparatus according to claim 14, wherein said locking means includes a housing having an opening in the upper portion thereof for receiving said pin when the bolt is retracted against the spring.

16. The apparatus according to claim 7, wherein said pin is removably secured to said bolt.

* * * * *